United States Patent
Shi et al.

(10) Patent No.: US 12,022,394 B2
(45) Date of Patent: Jun. 25, 2024

(54) METHOD FOR MONITORING WAKE-UP SIGNAL, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventors: Cong Shi, Dongguan (CN); Weijie Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 346 days.

(21) Appl. No.: 17/505,460

(22) Filed: Oct. 19, 2021

(65) Prior Publication Data

US 2022/0039014 A1    Feb. 3, 2022

Related U.S. Application Data

(63) Continuation of application No. PCT/CN2019/109093, filed on Sep. 29, 2019.

(51) Int. Cl.
*H04B 7/185*    (2006.01)
*H04W 52/02*    (2009.01)
(Continued)

(52) U.S. Cl.
CPC ..... *H04W 52/0232* (2013.01); *H04W 72/044* (2013.01); *H04W 72/23* (2023.01)

(58) Field of Classification Search
CPC ........... H04W 52/0232; H04W 72/044; H04W 72/23; H04W 52/0216; H04W 52/0235;
(Continued)

(56) References Cited

U.S. PATENT DOCUMENTS 7,952,565 B2 *   5/2011   Park .................... G06F 3/0416
                                                        345/173
8,175,109 B2 *   5/2012   Nogueira-Nine ..........................
                                                       H04W 52/0219
                                                        370/461
(Continued)

FOREIGN PATENT DOCUMENTS

CN    109314869 A    2/2019
CN    109496446 A    3/2019
(Continued)

OTHER PUBLICATIONS

International Search Report, dated Jun. 23, 2020 in Application No. PCT/CN2019/109093.

(Continued)

*Primary Examiner* — Amancio Gonzalez
(74) *Attorney, Agent, or Firm* — Perkins Coie LLP

(57) ABSTRACT

Disclosed in the present application is a method for monitoring a wake-up signal (WUS), comprising: a terminal device, on the basis of configuration information sent by a network device, determining a WUS monitoring occasion. The configuration information at least comprises: a bandwidth part parameter and/or a WUS monitoring occasion parameter, the WUS monitoring occasion being used to monitor a WUS. Further disclosed in the present application are a method for monitoring a wake-up signal, an electronic device, and a storage medium.

15 Claims, 6 Drawing Sheets

(51) Int. Cl.
*H04W 72/044* (2023.01)
*H04W 72/23* (2023.01)

(58) Field of Classification Search
CPC ............ H04W 76/28; H04W 52/0248; H04W 52/0229; H04W 72/0453; Y02D 30/70; H04L 5/0064; H04L 5/0098
USPC .................................................... 370/318
See application file for complete search history.

(56) References Cited

U.S. PATENT DOCUMENTS

| | | | | |
|---|---|---|---|---|
| 8,600,379 | B2 * | 12/2013 | Kim ................ | H04W 52/0245 455/574 |
| 8,724,536 | B2 * | 5/2014 | Gao ...................... | H04W 72/30 725/62 |
| 8,774,138 | B2 * | 7/2014 | Ramos .................. | H04W 72/52 370/336 |
| 9,986,452 | B2 * | 5/2018 | Liu ....................... | H04W 76/28 |
| 10,004,099 | B2 * | 6/2018 | Johansson ............. | H04W 76/28 |
| 10,159,109 | B2 * | 12/2018 | Kanesalingam ...... | H04W 72/30 |
| 10,211,838 | B2 * | 2/2019 | Liu ....................... | H03L 1/026 |
| 10,285,129 | B2 * | 5/2019 | Song ................... | H04W 52/0235 |
| 10,425,199 | B2 * | 9/2019 | Chen .................... | H04W 72/20 |
| 10,594,468 | B2 * | 3/2020 | Liao ................... | H04W 72/1273 |
| 10,743,257 | B2 * | 8/2020 | Liu ..................... | H04W 52/0229 |
| 10,805,979 | B2 * | 10/2020 | Chakraborty ......... | H04W 76/28 |
| 10,863,436 | B2 * | 12/2020 | Jeong ................. | H04W 52/0216 |
| 10,966,155 | B1 * | 3/2021 | Kasslin ................ | H04W 76/28 |
| 10,986,572 | B2 * | 4/2021 | Gan .................... | H04W 52/0235 |
| 11,013,018 | B2 * | 5/2021 | Shi ...................... | H04L 5/0007 |
| 11,032,047 | B2 * | 6/2021 | Liu .................... | H04W 52/0229 |
| 11,076,381 | B2 * | 7/2021 | Bhatoolaul ........ | H04W 52/0216 |
| 11,089,549 | B2 * | 8/2021 | Nam ................... | H04W 52/028 |
| 11,089,570 | B2 * | 8/2021 | Yi ........................ | H04L 5/0055 |
| 11,252,753 | B2 * | 2/2022 | Chen ................... | H04L 1/1887 |
| 11,284,477 | B2 * | 3/2022 | Islam .................. | H04W 76/11 |
| 11,350,365 | B2 * | 5/2022 | Nam ................... | H04W 52/0229 |
| 11,356,949 | B2 * | 6/2022 | Xu ...................... | H04W 76/28 |
| 11,363,668 | B2 * | 6/2022 | Tang ................. | H04W 72/0466 |
| 11,388,669 | B2 * | 7/2022 | Medles ............ | H04W 52/0229 |
| 11,483,768 | B2 * | 10/2022 | He ..................... | H04W 28/0284 |
| 11,483,866 | B2 * | 10/2022 | Myung ..................... | H04L 5/00 |
| 11,490,334 | B2 * | 11/2022 | Zhou .................... | H04L 1/1614 |
| 11,503,639 | B2 * | 11/2022 | Myung ............. | H04W 74/0808 |
| 11,516,737 | B2 * | 11/2022 | Kim ................. | H04W 52/0229 |
| 11,553,430 | B2 * | 1/2023 | Kwon ............... | H04W 52/0232 |
| 11,564,166 | B2 * | 1/2023 | Nam ................... | H04L 5/0051 |
| 11,564,282 | B2 * | 1/2023 | Jiang ................ | H04W 52/0248 |
| 11,588,606 | B2 * | 2/2023 | Papasakellariou .... | H04L 5/0098 |
| 11,606,751 | B2 * | 3/2023 | Lee ..................... | H04W 76/28 |
| 11,647,464 | B2 * | 5/2023 | Reial ................ | H04W 52/0235 370/311 |
| 11,722,916 | B2 * | 8/2023 | Xia ....................... | H04W 76/28 370/252 |
| 11,729,810 | B2 * | 8/2023 | Xia ....................... | H04W 72/542 370/329 |
| 11,729,857 | B2 * | 8/2023 | Islam .................. | H04W 52/028 370/311 |
| 11,764,932 | B2 * | 9/2023 | Nam ................... | H04W 68/025 370/318 |
| 2012/0275364 | A1 | 11/2012 | Anderson et al. | |
| 2012/0275366 | A1 * | 11/2012 | Anderson .......... | H04W 52/0219 370/311 |
| 2015/0195780 | A1 * | 7/2015 | Liu ................... | H04W 52/0216 370/311 |
| 2015/0208462 | A1 * | 7/2015 | Lee ................... | H04W 72/23 370/311 |
| 2015/0230180 | A1 * | 8/2015 | Lim ..................... | H04W 76/14 370/315 |
| 2018/0077688 | A1 * | 3/2018 | Yi ......................... | H04W 16/14 |
| 2018/0084501 | A1 * | 3/2018 | Mu .................. | H04W 52/0235 |
| 2018/0332533 | A1 * | 11/2018 | Bhattad .............. | H04W 52/0235 |
| 2019/0254110 | A1 * | 8/2019 | He ....................... | H04L 5/0048 |
| 2020/0029315 | A1 * | 1/2020 | Lin ....................... | H04W 24/08 |
| 2020/0221384 | A1 * | 7/2020 | Ang ................... | H04W 76/28 |
| 2020/0359314 | A1 * | 11/2020 | Wu .................. | H04W 52/0216 |
| 2020/0367193 | A1 * | 11/2020 | Cha ................... | H04W 48/12 |
| 2021/0168781 | A1 * | 6/2021 | Lee ..................... | H04W 72/23 |
| 2021/0176710 | A1 * | 6/2021 | Tooher ................. | H04W 76/28 |
| 2021/0185762 | A1 | 6/2021 | Li | |
| 2021/0321333 | A1 * | 10/2021 | Miao ................. | H04W 52/0274 |
| 2021/0345124 | A1 * | 11/2021 | Myung ................ | H04W 16/14 |
| 2021/0368444 | A1 * | 11/2021 | Wang ................ | H04W 52/0235 |
| 2022/0007408 | A1 * | 1/2022 | Xu .................... | H04W 52/0229 |
| 2022/0046540 | A1 * | 2/2022 | Kwon ................. | H04W 68/02 |
| 2022/0078879 | A1 * | 3/2022 | Nimbalker ............ | H04W 76/28 |
| 2022/0086756 | A1 * | 3/2022 | Reial ................ | H04W 52/0229 |
| 2022/0116875 | A1 * | 4/2022 | Nimbalker ........ | H04W 52/0216 |
| 2022/0182943 | A1 * | 6/2022 | Maleki ............. | H04W 52/0241 |
| 2022/0191793 | A1 * | 6/2022 | Murray ................ | H04W 72/23 |
| 2023/0145663 | A1 * | 5/2023 | Kwon ................. | H04L 5/0057 370/318 |

FOREIGN PATENT DOCUMENTS

| | | |
|---|---|---|
| CN | 109561038 A | 4/2019 |
| CN | 109923904 A | 6/2019 |
| CN | 109923914 A | 6/2019 |
| CN | 109952789 A | 6/2019 |
| CN | 110199550 A | 9/2019 |
| WO | 2018204799 A1 | 11/2018 |
| WO | 2020055191 A1 | 3/2020 |

OTHER PUBLICATIONS

Huawei, Hisilicon, PDCCH-based power saving signal/channel, R1-1906005, 3GPP TSG RAN WG1 Meeting #97, May 13-17, 2019, May 2019.
R2-1911515, 3GPP TSG-RAN WG2, Report from session on Legacy LTE, Rel-15 LTE, and NR NTN SI, NR power saving SI, May 13-17, 2019, May 2019.
Asia Pacific Telecom Co. Ltd. "UE behavior on WUS occasion in DRX Active Time" R2-1911618; 3GPP TSG-RAN WG2 Meeting #107; Prague, Czech Republic; Aug. 26-30, 2019. 5 pages.
CATT "Summary of PDCCH-based Power Saving Signal/Channel" R1-1909732; 3GPP TSG-RAN WG1 #98; Prague, CZ; Aug. 26-30, 2019. 28 pages.
First Office Action for Chinese Application No. 202111179362.8 dated Jan. 19, 2023. 15 pages with English translation.
Huawei et al. "Discussion on the impact of WUS to the C-DRX" R2-1911241; 3GPP TSG-RAN2 Meeting #107; Prague, CZ; Aug. 26-30, 2019. 4 pages.
Intel Corporation "Considerations on PDCCH-based power saving signal" R1-1908656; 3GPP TSG-RAN WG1 #98; Prague, CZ; Aug. 26-30, 2019. 9 pages.
Notice of Reasons for Refusal for Japanese Application No. 2021-575488 dated Apr. 11, 2023. 10 pages with English translation.
Samsung "PDCCH-based power saving signal/channel" R1-1906980; 3GPP TSG RAN WG1 #97; Reno, USA; May 13-17, 2019. 13 pages.
Examination Report for Indian Application No. 202117044601 dated May 27, 2022. 7 pages with English translation.
Extended European Search Report for European Application No. 19947212.7 dated Apr. 12, 2022. 9 pages.
Xiaomi Communications "Discussion on how the WUS works with C-DRX" R2-1906484; 3GPP TSG-RAN2 #106; Reno, USA; May 13-17, 2019. 4 pages.

* cited by examiner

METHOD FOR MONITORING WAKE-UP SIGNAL, ELECTRONIC DEVICE, AND STORAGE MEDIUM

CROSS-REFERENCE TO RELATED APPLICATION

The present application is a continuation application of International PCT Application No. PCT/CN2019/109093, filed on Sep. 29, 2019, the entire content of which is hereby incorporated by reference.

TECHNICAL FIELD

The present application relates to the field of wireless communication technologies, in particular to a method for monitoring a Wake-Up Signal (WUS), an electronic device, and a storage medium.

BACKGROUND

In a New Radio (NR) system, a WUS based on a Physical Downlink Control Channel (PDCCH) is introduced for a User Equipment (UE) in a connected state during a Discontinuous Reception (DRX) process. However, how to monitor the WUS by the UE based on a configuration from a network device is a problem to be solved.

SUMMARY

Embodiments of the present application provide a method for monitoring a WUS, an electronic device, and a storage medium, so that a terminal device can determine a WUS monitoring occasion for monitoring a WUS based on a configuration from a network device.

In a first aspect, an embodiment of the present application provides a method for monitoring a Wake-Up Signal (WUS), which includes: determining a WUS monitoring occasion according to configuration information sent by a network device; the configuration information at least includes a BandWidth Part (BWP) parameter and/or a WUS monitoring occasion parameter, and the WUS monitoring occasion is used for monitoring the WUS.

In a second aspect, an embodiment of the present application provides a method for monitoring a WUS, which includes: sending, by a network device, configuration information to a terminal device, wherein the configuration information at least includes a BWP parameter and/or a WUS monitoring occasion parameter; and the configuration information is used for the terminal device to determine a WUS monitoring occasion.

In a third aspect, an embodiment of the present application provides a terminal device, which includes a processing unit configured to determine a WUS monitoring occasion according to configuration information sent by a network device; the configuration information at least includes a BWP parameter and/or a WUS monitoring occasion parameter, and the WUS monitoring occasions are used for monitoring a WUS.

In a fourth aspect, an embodiment of the present application provides a network device, which includes a sending unit configured to send configuration information to a terminal device, the configuration information at least includes a BWP parameter and/or a WUS monitoring occasion parameter; and the configuration information is used for the terminal device to determine a WUS monitoring occasion.

In a fifth aspect, an embodiment of the present application provides a terminal device, including: a processor and a memory configured to store a computer program that is capable of being run on the processor, wherein the processor is configured to perform acts of the method for monitoring the WUS performed by the above terminal device when the computer program is run on the processor.

In a sixth aspect, an embodiment of the present application provides a network device, including: a processor and a memory configured to store a computer program that is capable of being run on the processor, wherein the processor is configured to perform acts of the method for monitoring the WUS performed by the above network device when the computer program is run on the processor.

In a seventh aspect, an embodiment of the present application provides a chip, including a processor, configured to invoke and run a computer program from a memory, to enable a terminal device installed with the chip to perform the above method for monitoring the WUS.

In an eighth aspect, an embodiment of the present application provides a chip, including a processor, configured to invoke and run a computer program from a memory, to enable a network device installed with the chip to perform the above method for monitoring the WUS.

In a ninth aspect, an embodiment of the present application provides a storage medium, storing an executable program, wherein, when the executable program is executed by a processor, the method for monitoring the WUS performed by the above terminal device is implemented.

In a tenth aspect, an embodiment of the present application provides a storage medium, storing an executable program, wherein, when the executable program is executed by a processor, the method for monitoring the WUS performed by the above network device is implemented.

In an eleventh aspect, an embodiment of the present application provides a computer program product, including computer program instructions that enable a computer to implement the method for monitoring the WUS performed by the above terminal device.

In a twelfth aspect, an embodiment of the present application provides a computer program product, including computer program instructions that enable a computer to implement the method for monitoring the WUS performed by the above network device.

In a thirteenth aspect, an embodiment of the present application provides a computer program, which enables a computer to implement the method for monitoring the WUS performed by the above terminal device.

In a fourteenth aspect, an embodiment of the present application provides a computer program, which enables a computer to implement the method for monitoring the WUS performed by the above network device.

The method for monitoring the WUS provided by the embodiment of the present application includes: determining, by a terminal device, a WUS monitoring occasion according to configuration information sent by a network device; and the configuration information at least includes a BWP parameter and/or a WUS monitoring occasion parameter, and the WUS monitoring occasion is used for monitoring the WUS. In this way, the embodiment of the present application clarify a way in which the network device configures the WUS monitoring occasion to the terminal device, and clarify a way in which the terminal device determines the WUS monitoring occasion for monitoring the WUS according to the configuration information sent by the network device.

DETAILED DESCRIPTION

Figure 1:
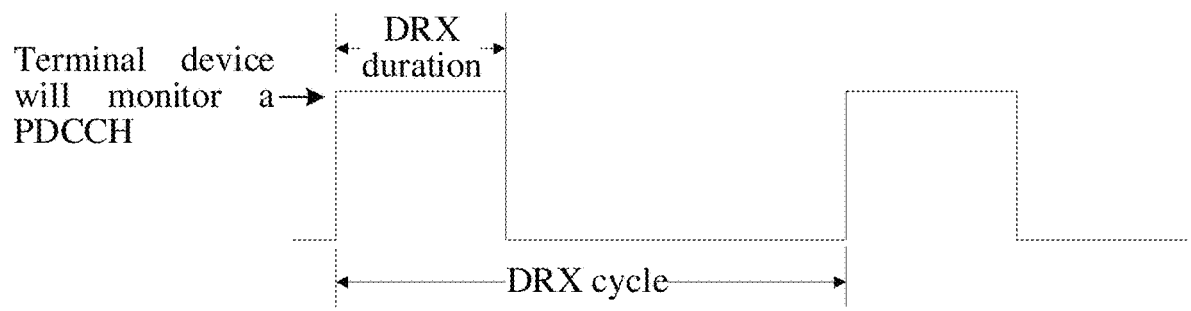
FIG. 1 is a schematic diagram of a discontinuous reception cycle of a terminal device of the present application.

In order to understand features and technical contents of embodiments of the present application in more detail, implementations of the embodiments of the present application will be described in detail below in combination with the accompanying drawings, which are for reference only and are not intended to limit the embodiments of the present application.

Before a method for monitoring a WUS provided by an embodiment of the present application, DRX in an NR system will be briefly explained first.

In an NR system, a network device may configure a DRX function for a terminal device, so that the terminal device monitors a PDCCH discontinuously, thereby achieving a purpose of saving power of the terminal device. Each Medium Access Control (MAC) entity has a DRX configuration; and DRX configuration parameters include following parameters.

1) DRX-onDurationTimer: a duration of waking up of a terminal device at beginning of a DRX Cycle.

2) DRX-SlotOffset: a time delay for a terminal device to start a DRX-onDurationTimer.

3) DRX-InactivityTimer: a duration for a terminal device to continue to monitor a PDCCH after the terminal device receives a PDCCH indicating uplink initial transmission or downlink initial transmission.

4) DRX-RetransmissionTimerDL: a longest duration for a terminal device to monitor a PDCCH indicating downlink retransmission scheduling. Except a broadcast Hybrid Automatic Repeat reQuest (HARQ) process, each downlink HARQ process corresponds to one DRX-RetransmissionTimerDL.

5) DRX-RetransmissionTimerUL: a longest duration for a terminal device to monitor a PDCCH indicating uplink retransmission scheduling. Each uplink HARQ process corresponds to one DRX-RetransmissionTimerUL.

6) DRX-LongCycleStartOffset: which is used to configure a long DTX cycle and a subframe offset at beginning of a Long DRX cycle and a Short DRX Cycle.

7) DRX-ShortCycle: an optional configuration.

8) DRX-ShortCycleTimer: a duration for which a terminal device is in a Short DRX cycle (and has not received any PDCCH), which is an optional configuration.

9) DRX-HARQ-RTT-TimerDL: a minimum waiting time required for a terminal device to expect to receive a PDCCH indicating downlink scheduling, and except a broadcast HARQ process, each downlink HARQ process corresponds to one DRX-HARQ-RTT-TimerDL.

10) DRX-HARQ-RTT-TimerUL: a minimum waiting time required for a terminal device to expect to receive a PDCCH indicating uplink scheduling, and each uplink HARQ process corresponds to one DRX-HARQ-RTT-TimerUL.

If the terminal device is configured with DRX, the terminal device needs to monitor a PDCCH during DRX Active Time. The DRX Active Time includes the following situations.

1) Any one of the following five timers is running: a DRX-onDurationTimer, a DRX-InactivityTimer, a DRX-RetransmissionTimerDL, a DRX-RetransmissionTimerUL, and a ra-ContentionResolutionTimer.

2) A Scheduling Request (SR) is sent on a PUCCH and is in a pending state.

3) In a contention-based random access procedure, after successfully receiving a random access response, a terminal device has not received an initial transmission indicated by a PDCCH scrambled by a Cell Radio Network Temporary Identifier (C-RNTI).

DRX long cycle is a default configuration, and DRX short cycle is an optional configuration. For a terminal device configured with a short DRX cycle, a switch mode between a long DRX cycle and a short DRX cycle is as follows.

A terminal device uses a DRX short cycle when any of the following conditions are met: 1) a DRX-InactivityTimer times out; and 2) the terminal receives a DRX Command Medium Access Control (MAC) Control Element (CE).

A terminal device uses a DRX long cycle when any of the following conditions are met: 1) a DRX-ShortCycleTimer times out; and 2) the terminal device receives a long DRX command MAC CE.

The terminal device determines a time to start a DRX-onDurationTimer according to whether it is currently in a short DRX cycle or a long DRX cycle. Specific provisions are as follows.

1) If a Short DRX Cycle is used and a current subframe satisfies [(SFN×10)+subframe number] modulo (DRX-ShortCycle)=(DRX-StartOffset) modulo (DRX-ShortCycle).

Or, if a Long DRX Cycle is used and a current subframe satisfies [(SFN×10)+subframe number] modulo (DRX-LongCycle)=DRX-StartOffset.

2) A DRX-onDurationTimer is started at a time of DRX-SlotOffset slots from beginning of a current subframe.

A terminal device starts or restarts a DRX-InactivityTimer under the following condition: if the terminal device receives a PDCCH indicating downlink or uplink initial transmission, the terminal starts or restarts the DRX-InactivityTimer.

A terminal device starts and stops a DRX-RetransmissionTimerDL under the following conditions.

When the terminal device receives a PDCCH indicating downlink transmission, or when the terminal device receives a MAC Protocol Data Unit (PDU) on a configured downlink grant resource, the terminal device stops a DRX-Retransmission TimerDL corresponding to the HARQ process. The terminal device starts a DRX-HARQ-RTT-TimerDL corresponding to the HARQ process after completing transmission of feedback for the HARQ process of this downlink transmission.

If a DRX-HARQ-RTT-TimerDL corresponding to a certain HARQ of the terminal device times out and decoding of downlink data transmitted by using this HARQ process is unsuccessful, the terminal device starts a DRX-RetransmissionTimerDL corresponding to this HARQ process.

A terminal device starts and stops a DRX-RetransmissionTimerUL under the following conditions.

When the terminal device receives a PDCCH indicating uplink transmission, or when the terminal device sends a MAC PDU on a configured uplink grant resource, the terminal device stops a DRX-RetransmissionTimerUL corresponding to the HARQ process. The terminal device starts a DRX-HARQ-RTT-TimerUL corresponding to the HARQ process after completing a first repetition of the PUSCH.

If a DRX-HARQ-RTT-TimerUL corresponding to a certain HARQ of the terminal device times out, the terminal device starts a DRX-RetransmissionTimerUL corresponding to a process of this HARQ.

A schematic diagram of a DRX cycle of a terminal device is as shown in FIG. 1, a network device configures a WUS function for the terminal device, and a network informs the terminal device whether a DRX-onDurationTimer needs to be started to monitor a PDCCH by sending a WUS to the terminal device before a starting time of the DRX-onDurationTimer. The terminal device needs to monitor a WUS at a WUS monitoring occasion before a starting time of a DRX-onDurationTimer in each DRX cycle, and determines whether to normally start a DRX-onDurationTimer at a subsequent starting time of the DRX-onDurationTimer according to an indication of the WUS. How a network device configures a WUS monitoring occasion for a terminal device (UE) and how the terminal device monitors a WUS based on a configuration from the network device are problems that need to be solved.

In view of the above problems, an embodiment of the present application provides a method for monitoring a WUS, which may be applied to various communication systems, such as a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, an advanced long term evolution (LTE-A) system, a new radio (NR) system, an evolution system of an NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, wireless local area networks (WLAN), wireless fidelity (WiFi), a next generation communication system, or other communication systems.

Generally speaking, traditional communication systems support a limited quantity of connections and are easy to implement. However, with development of communication technologies, mobile communication systems will not only support traditional communication, but also support, for example, device to device (D2D) communication, machine to machine (M2M) communication, machine type communication (MTC), vehicle to vehicle (V2V) communication, and the embodiments of the present application may also be applied to these communication systems.

System architectures and service scenarios described in the embodiments of the present application are intended to more clearly illustrate technical solutions of the embodiments of the present application, and do not constitute a limitation on the technical solutions provided in the embodiments of the present application. Those of ordinary skill in the art may know that with evolution of network architectures and emergence of new service scenarios, the technical solutions provided by the embodiments of the present application are also applicable for similar technical problems.

The network device involved in the embodiments of the present application may be an ordinary base station (such as NodeB or eNB or gNB), a new radio controller (NR controller), a centralized unit, a new radio base station, an RF remote module, a micro base station, a relay, a distributed unit, a transmission reception point (TRP), a transmission point (TP), or any other device. The embodiments of the present application do not limit a specific technology and a specific device form adopted by the network device. For convenience of description, in all embodiments of the present application, the above-mentioned device for providing wireless communication functions for a terminal device are collectively referred to as a network device.

In the embodiments of the present application, a terminal device may be any terminal, for example, the terminal device may be a User Equipment of machine type communication. That is, the terminal device may be referred to as a User Equipment, a Mobile Station (MS), a mobile terminal, a terminal, etc. The terminal device may communicate with one or more core networks via a Radio Access Network (RAN). For example, the terminal device may be a mobile phone (or a "cellular" phone), a computer with a mobile terminal, etc. For example, terminal devices may be portable, pocket-size, handheld, computer-built, or vehicle-mounted mobile apparatuses, and they exchange voices and/or data with a wireless access network. The embodiments of the present application are not specifically limited thereto.

Optionally, the network device and the terminal device may be deployed on land, including indoors or outdoors, hand-held or vehicle-mounted; or may be deployed on a water surface; or may be deployed on a plane, a balloon, and an artificial satellite in the air. The embodiments of the present application do not limit application scenarios of the network device and the terminal device.

Optionally, communication between a network device and a terminal device and communication between a terminal device and another terminal device may be conducted through a licensed spectrum, an unlicensed spectrum, or both. Communication between a network device and a terminal device and communication between a terminal device and another terminal device may be conducted through a frequency spectrum below 7 gigahertz (GHz), or a frequency spectrum above 7 GHz, and both a frequency spectrum below 7 GHz and a frequency spectrum above 7 GHz may be used for the above communications at the same time. The embodiments of the present application do not limit a spectrum resource used between a network device and a terminal device.

Generally speaking, traditional communication systems support a limited quantity of connections and are easy to implement. However, with development of communication technologies, mobile communication systems will not only support traditional communication, but also support, for example, device to device (D2D) communication, machine to machine (M2M) communication, machine type communication (MTC), vehicle to vehicle (V2V) communication, and the embodiments of the present application may also be applied to these communication systems.

Figure 2:
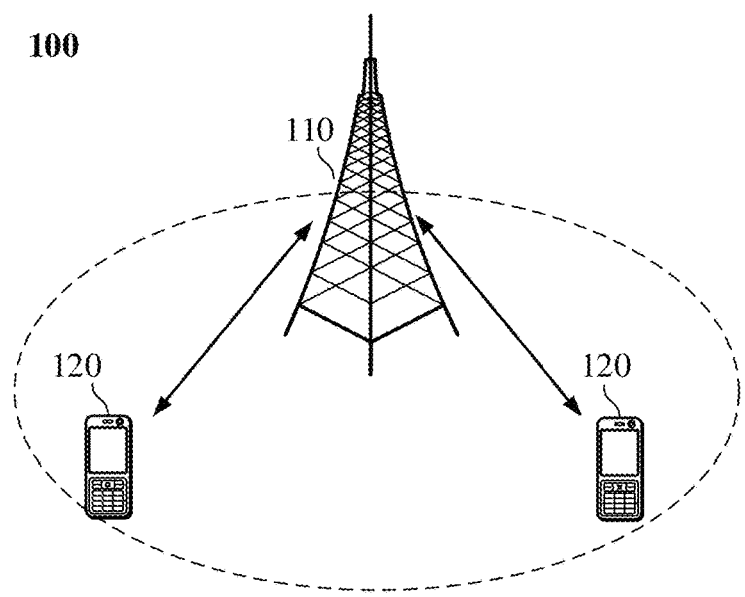
FIG. 2 is a schematic diagram of a structure of a communication system provided by an embodiment of the present application.

Illustratively, a communication system 100 applied in an embodiment of the present application is shown in FIG. 2. The communication system 100 may include a network device 110, which may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a base transceiver station (BTS) in a GSM system or CDMA system, a NodeB (NB) in a WCDMA system, or an Evolutional Node B (eNB or eNodeB) in an LTE system, or a radio controller in a cloud radio access network (CRAN). Or the network device may be a mobile switching center, a relay station, an access point, a vehicle-mounted device, a wearable device, a hub, a switch, a bridge, a router, a network side device in a 5G network, or a network device in a future evolved public land mobile network (PLMN).

The communication system 100 further includes at least one terminal device 120 located within a coverage range of the network device 110. As used herein, the term "terminal device" includes, but is not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, or an AM-FM broadcast transmitter; and/or another terminal device; and/or an Internet of Things (IoT) device. A terminal device configured to communicate via a wireless interface may be referred to as "a wireless communication terminal", "a wireless terminal" or "a mobile terminal". Examples of the mobile terminal include, but are not limited to, a satellite or cellular telephone, a Personal Communication System (PCS) terminal capable of combining with a cellular wireless telephone and data processing, faxing, and data communication capabilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), etc.

Optionally, Device to Device (D2D) communication may be performed between the terminal devices 120.

Optionally, the 5G system or 5G network may also be referred to as a New Radio (NR) system or a NR network.

Figure 3:
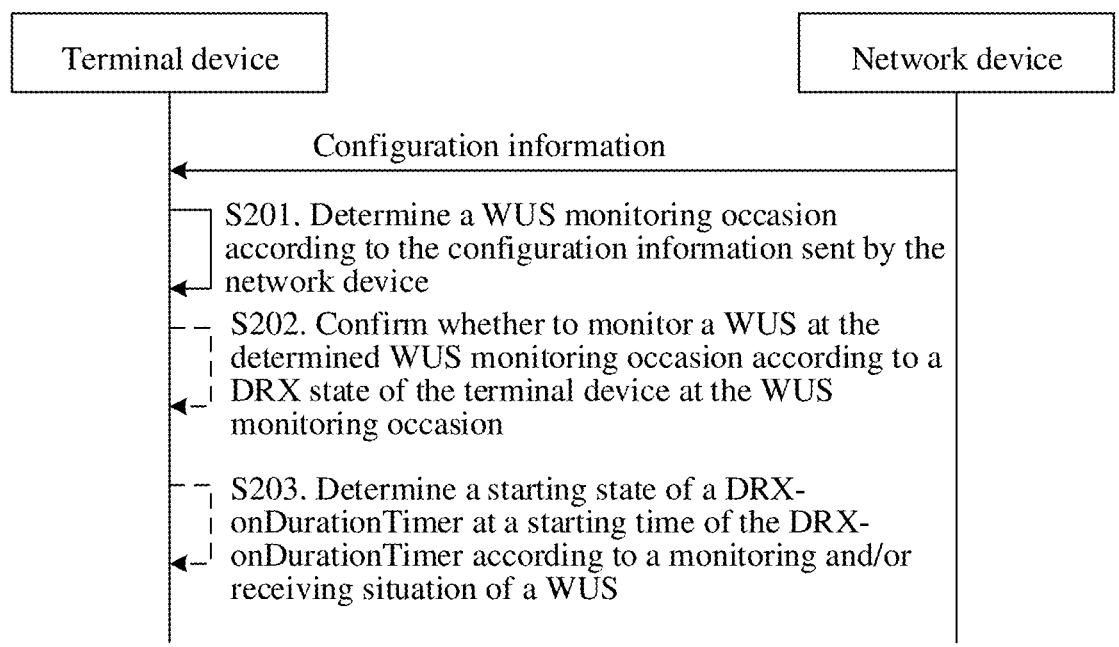
FIG. 3 is a schematic diagram of an optional processing flow of a method for monitoring a WUS provided by an embodiment of the present application.

A method for monitoring a WUS provided by an embodiment of the present application is an optional processing flow, as shown in FIG. 3, and includes the following acts.

In act S201, a terminal device determines a WUS monitoring occasion according to configuration information sent by a network device; and the WUS monitoring occasion is used for monitoring a WUS.

In some embodiments, the configuration information at least includes a BWP parameter and/or a WUS monitoring occasion parameter.

In some embodiments, the BWP parameter may include at least one downlink bandwidth part, and the downlink bandwidth part includes at least one PDCCH search space.

In some embodiments, the PDCCH search space includes a WUS-specific PDCCH search space. In a specific implementation, when a network device sends a PDCCH search space to a terminal device, the network device may indicate to the terminal device whether the PDCCH search space is a WUS-specific PDCCH search space.

In some embodiments, the WUS monitoring occasion parameter is related to a starting time of a DRX-onDurationTimer of the terminal device. In a specific implementation, the WUS monitoring occasion parameter includes: a maximum time offset between the WUS monitoring occasion and a starting time of a DRX-onDurationTimer; and/or a minimum time offset between the WUS monitoring occasion and the starting time of the DRX-onDurationTimer.

In some embodiments, the configuration information also includes a DRX configuration parameter, that is, a network device also sends a DRX configuration parameter to a terminal device, such as a long DRX cycle, a short DRX cycle, and a DRX-onDurationTimer.

The configuration information sent by the network device to the terminal device may be sent through Radio Resource Control (RRC) configuration information.

On a basis of the configuration information sent by the network device to the terminal device, before a starting time of a DRX-onDurationTimer in each DRX cycle, the terminal device determines one or more PDCCH transmission occasions for monitoring the WUS according to the configuration information. An optional implementation of determining, by the terminal device, the WUS monitoring occasion according to the configuration information sent by the network device at least includes one of the following.

1) The terminal device determines that in all PDCCH search spaces configured on a currently activated downlink BWP, all PDCCH transmission occasions between the maximum time offset and the minimum time offset are the WUS monitoring occasions.

2) The terminal device determines that in WUS-specific PDCCH search spaces configured on a currently activated downlink BWP, all WUS-specific PDCCH transmission occasions between the maximum time offset and the minimum time offset are the WUS monitoring occasions.

3) The terminal device determines that in all PDCCH transmission occasions between the maximum time offset and the minimum time offset of all PDCCH search spaces configured on a currently activated downlink BWP, at most N PDCCH transmission occasions closest to a starting time of a DRX-onDurationTimer are the WUS monitoring occasions, and N is a positive integer; in which N is configured by a network device, or N is preset.

In a specific implementation, if a quantity of all PDCCH transmission occasions between the maximum time offset and the minimum time offset is greater than or equal to a value of N configured by the network device, the terminal device determines that in all PDCCH transmission occasions between the maximum time offset and the minimum time offset of all PDCCH search spaces configured on a currently activated downlink BWP, N PDCCH transmission occasions closest to a starting time of a DRX-onDurationTimer are the WUS monitoring occasions. And if a quantity of all PDCCH transmission occasions between the maximum time offset and the minimum time offset is less than a value of N configured by the network device, the terminal device determines that in all PDCCH search spaces configured on a currently activated downlink BWP, all PDCCH transmission occasions between the maximum time offset and the minimum time offset are the WUS monitoring occasions.

4) The terminal device determines that in all WUS-specific PDCCH transmission occasions between the maximum time offset and the minimum time offset of WUS-specific PDCCH search spaces configured on a currently activated downlink BWP, at most N PDCCH transmission occasions closest to a starting time of a DRX-onDuration-Timer are the WUS monitoring occasions, and N is a positive integer; in which N is configured by a network device, or N is preset.

In a specific implementation, if a quantity of all WUS-specific PDCCH transmission occasions between the maximum time offset and the minimum time offset is greater than or equal to a value of N configured by the network device, the terminal device determines that in all WUS-specific PDCCH transmission occasions between the maximum time offset and the minimum time offset of all PDCCH search spaces configured on a currently activated downlink BWP, N WUS-specific PDCCH transmission occasions closest to a starting time of a DRX-onDurationTimer are the WUS monitoring occasions. If a quantity of all WUS-specific PDCCH transmission occasions between the maximum time offset and the minimum time offset is less than a value of N configured by the network device, the terminal device determines that in all PDCCH search spaces configured on a currently activated downlink BWP, all WUS-specific PDCCH transmission occasions between the maximum time offset and the minimum time offset are the WUS monitoring occasions.

5) The terminal device determines that in all PDCCH transmission occasions between the minimum time offset and a starting time of a DRX-onDurationTimer in a current DRX cycle of all PDCCH search spaces configured on a currently activated downlink BWP, at most N PDCCH transmission occasions closest to the starting time of the DRX-onDurationTimer are the WUS monitoring occasions, and N is a positive integer; in which N is configured by a network device, or N is preset.

In a specific implementation, if a quantity of all PDCCH transmission occasions between the minimum time offset and a starting time of a DRX-onDurationTimer in a current DRX cycle is greater than or equal to a value of N configured by the network device, the terminal device determines that in all PDCCH transmission occasions between the minimum time offset and the starting time of the DRX-onDuration-Timer in the current DRX cycle of all PDCCH search spaces configured on a currently activated downlink BWP, N PDCCH transmission occasions closest to the starting time of the DRX-onDurationTimer are the WUS monitoring occasions. And if a quantity of all PDCCH transmission occasions between the minimum time offset and a starting time of a DRX-onDurationTimer in a current DRX cycle is less than a value of N configured by the network device, the terminal device determines that in all PDCCH search spaces configured on a currently activated downlink BWP, all PDCCH transmission occasions between the minimum time offset and the starting time of the DRX-onDurationTimer in the current DRX cycle are the WUS monitoring occasions.

6) The terminal device determines that in all WUS-specific PDCCH transmission occasions between the minimum time offset and a starting time of a DRX-onDuration-Timer in a current DRX cycle of WUS-specific PDCCH search spaces configured on a currently activated downlink BWP, at most N PDCCH transmission occasions closest to the starting time of the DRX-onDurationTimer are the WUS monitoring occasions, and N is a positive integer; in which N is configured by a network device, or N is preset.

In a specific implementation, if a quantity of all WUS-specific PDCCH transmission occasions between the minimum time offset and a starting time of a DRX-onDuration-Timer in a current DRX cycle is greater than or equal to a value of N configured by the network device, the terminal device determines that in all WUS-specific PDCCH transmission occasions between the minimum time offset and the starting time of the DRX-onDurationTimer in the current DRX cycle of all PDCCH search spaces configured on a currently activated downlink BWP, N WUS-specific PDCCH transmission occasions closest to the starting time of the DRX-onDurationTimer are the WUS monitoring occasions. And if a quantity of all WUS-specific PDCCH transmission occasions between the minimum time offset and a starting time of a DRX-onDurationTimer in a current DRX cycle is less than a value of N configured by the network device, the terminal device determines that in all PDCCH search spaces configured on a currently activated downlink BWP, all WUS-specific PDCCH transmission occasions between the minimum time offset and the starting time of the DRX-onDurationTimer in the current DRX cycle are the WUS monitoring occasions.

7) The terminal device determines that in all PDCCH transmission occasions between the minimum time offset and the maximum time offset of all PDCCH search spaces configured on a currently activated downlink BWP, at most N PDCCH transmission occasions farthest from a starting time of a DRX-onDurationTimer are the WUS monitoring occasions, and N is a positive integer; in which N is configured by a network device, or N is preset.

In a specific implementation, if a quantity of all PDCCH transmission occasions between the minimum time offset and the maximum time offset is greater than or equal to a value of N configured by the network device, the terminal device determines that in all PDCCH transmission occasions between the minimum time offset and the maximum time offset of all PDCCH search spaces configured on a currently activated downlink BWP, N PDCCH transmission occasions farthest from a starting time of a DRX-onDurationTimer are the WUS monitoring occasions. And if a quantity of all PDCCH transmission occasions between the minimum time offset and the maximum time offset is less than a value of N configured by the network device, the terminal device determines that in all PDCCH search spaces configured on a currently activated downlink BWP, all PDCCH transmission occasions between the minimum time offset and the maximum time offset are the WUS monitoring occasions.

8) The terminal device determines that in all WUS-specific PDCCH transmission occasions between the minimum time offset and the maximum time offset of WUS-specific PDCCH search spaces configured on a currently activated downlink BWP, at most N PDCCH transmission occasions farthest from a starting time of a DRX-onDura-tionTimer are the WUS monitoring occasions, and N is a positive integer; in which N is configured by a network device, or N is preset.

In a specific implementation, if a quantity of all WUS-specific PDCCH transmission occasions between the minimum time offset and the maximum time offset is greater than or equal to a value of N configured by the network device, the terminal device determines that in all WUS-specific PDCCH transmission occasions between the minimum time offset and the maximum time offset of all PDCCH search spaces configured on a currently activated downlink BWP, N WUS-specific PDCCH transmission occasions farthest from a starting time of a DRX-onDurationTimer are the WUS monitoring occasions. If a quantity of all WUS-specific PDCCH transmission occasions between the minimum time offset and the maximum time offset is less than a value of N configured by the network device, the terminal device determines that in all PDCCH search spaces configured on a currently activated downlink BWP, all WUS-specific PDCCH transmission occasions between the minimum time offset and the maximum time offset are the WUS monitoring occasions.

The maximum time offset is a maximum time offset between the WUS monitoring occasion and a starting time of a subsequent DRX-onDurationTimer, and the minimum time offset is a minimum time offset between the WUS monitoring occasion and the starting time of the subsequent DRX-onDurationTimer.

Based on the above implementations, the terminal device may determine the WUS monitoring occasion. In some embodiments, the method further includes act S202.

In act S202, the terminal device confirms whether to monitor the WUS at the determined WUS monitoring occasion according to a DRX state of the terminal device at the WUS monitoring occasion.

In some embodiments, the terminal device does not monitor the WUS at the WUS monitoring occasion in a case where a time domain corresponding to the WUS monitoring occasion is within DRX active time.

In some embodiments, the terminal device does not monitor the WUS at the WUS monitoring occasion in a case where part of a time domain corresponding to the WUS monitoring occasion is within DRX active time.

In some embodiments, the terminal device monitors the WUS at the WUS monitoring occasion in a case where a time domain corresponding to the WUS monitoring occasion is not within DRX active time.

In some embodiments, the method further includes act S203.

In act S203, the terminal device determines a starting state of a DRX-onDurationTimer at a starting time of the DRX-onDurationTimer according to a monitoring and/or receiving situation of a WUS.

In some embodiments, in a case where a quantity of WUS monitoring occasions determined by the terminal device in act S201 is zero, the terminal device determines to start a DRX-onDurationTimer at the starting time of the DRX-onDurationTimer.

In some embodiments, in a case where the terminal device determines that a quantity of WUS monitoring occasions at which a WUS needs to be monitored is zero in act S202, the terminal device determines to start a DRX-onDurationTimer at the starting time of the DRX-onDurationTimer.

In some embodiments, in a case where the terminal device monitors and receives a WUS indicating to wake up the terminal device, the terminal device determines to start a DRX-onDurationTimer at the starting time of the DRX-onDurationTimer.

In some embodiments, in a case where the terminal device monitors and receives a WUS and the WUS indicates to not wake up the terminal device, the terminal device determines to not start a DRX-onDurationTimer at the starting time of the DRX-onDurationTimer.

In some embodiments, in a case where the terminal device monitors a WUS and does not receive a WUS, the terminal device determines to not start a DRX-onDurationTimer at a starting time of the DRX-onDurationTimer.

In various embodiments of the present application, a time interval between the WUS monitoring occasion and a starting time of a DRX-onDurationTimer is not greater than a DRX cycle.

Based on the above description of the method for monitoring the WUS provided by the embodiments of the present application, an optional detailed processing flow for monitoring the WUS provided by an embodiment of the present application includes the following acts.

In act S301, a terminal device receives Radio Resource Control (RRC) configuration information sent by a network device.

In some embodiments, the RRC configuration information includes contents of the following 1) to 4).

1) A DRX configuration parameter including: a long DRX cycle, a DRX-onDurationTimer and etc.

2) A BWP configuration parameter including one DL BWP.

3) For one DL BWP configured for the terminal device, four PDCCH search spaces are configured, an optional schematic diagram of determining the WUS monitoring occasion is as shown in the following FIG. 4, and all the four PDCCH search spaces may be used as WUS monitoring occasions for the terminal device to monitor the WUS.

4) A configuration of a WUS monitoring occasion in a time domain: configuring a maximum time offset WUS_offset_max between the WUS monitoring occasion and a starting time of a DRX-onDurationTimer, and a minimum time offset WUS_offset_min between the WUS monitoring occasion and a starting time of a DRX-onDurationTimer.

In act S302, the terminal device determines that in all PDCCH search spaces configured on a currently activated downlink BWP, all PDCCH transmission occasions between the maximum time offset and the minimum time offset are the WUS monitoring occasions.

Figure 4:
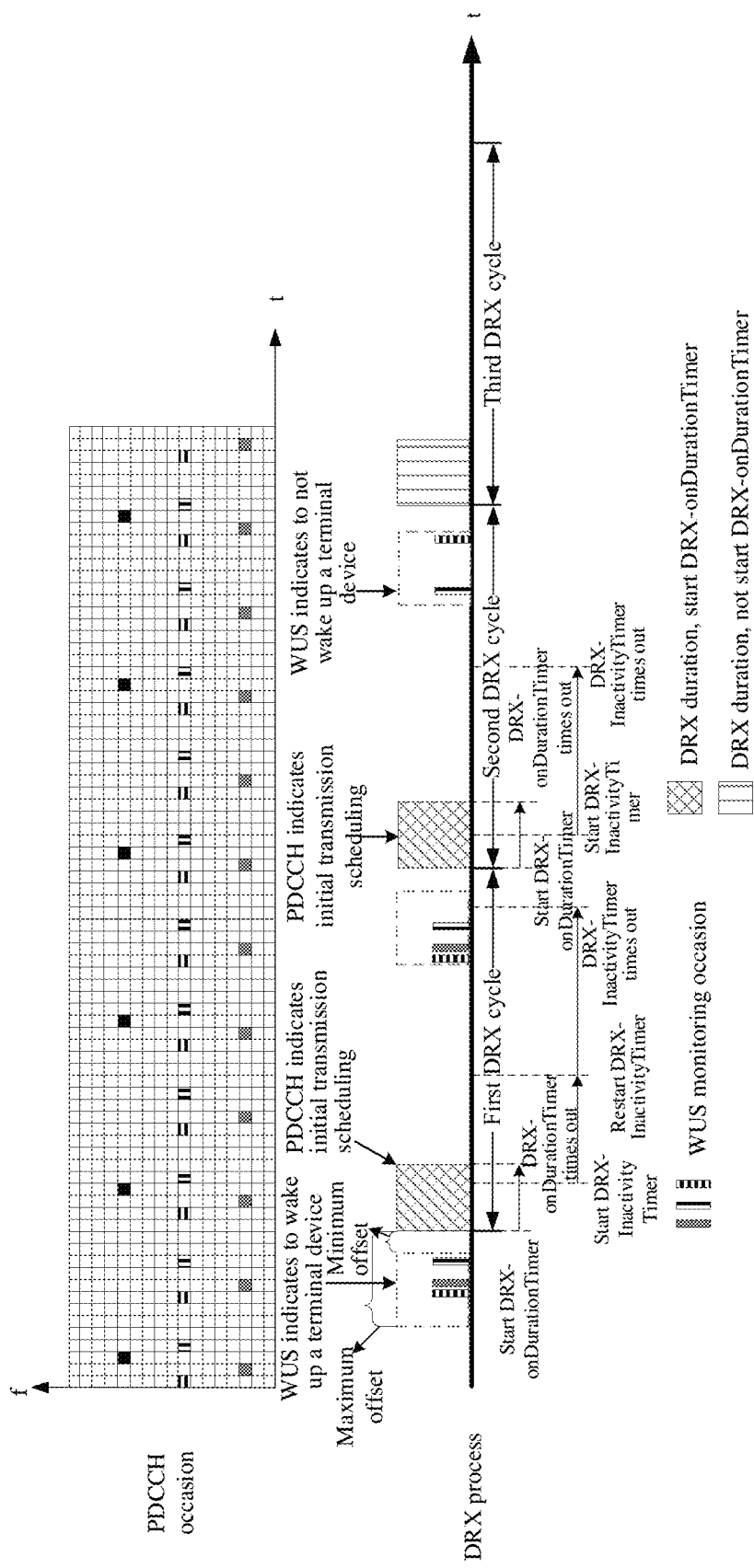
FIG. 4 is an optional schematic diagram for determining a WUS monitoring occasion of an embodiment of the present application.

According to FIG. 4, there are three PDCCH occasions between the maximum time offset and the minimum time offset, wherein the maximum time offset is a maximum time offset between the WUS monitoring occasion and a starting time of a DRX-onDurationTimer, and the minimum time offset is a minimum time offset between the WUS monitoring occasion and a starting time of a DRX-onDurationTimer, then the terminal device determines that the three PDCCH occasions are WUS monitoring occasions.

In act S303, the terminal device monitors a WUS on a determined WUS monitoring occasion and detects that the WUS indicates to wake up the terminal device, then the terminal device starts a DRX-onDurationTimer at a starting time of the DRX-onDurationTimer in a first DRX cycle.

In act S304, the terminal device receives a PDCCH indicating an initial transmission scheduling during running of a DRX-onDurationTimer, then the terminal device starts a DRX-InactivityTimer. Subsequently, the terminal device receives a PDCCH indicating an initial transmission scheduling again during running of a DRX-InactivityTimer, then the terminal device restarts the DRX-InactivityTimer.

In act S305, there are three PDCCH occasions within time between the maximum time offset WUS_offset_max and the minimum time offset WUS_offset_min before a starting time of a DRX-onDurationTimer in a second DRX cycle, then the terminal device determines that the three PDCCH occasions are WUS monitoring occasions.

In act S306, during the three WUS monitoring occasions determined in act S305, the terminal device is in DRX Active Time and a DRX-InactivityTimer is running, so the terminal device does not monitor a WUS at these three WUS monitoring occasions.

In act S307, the terminal device starts a DRX-onDurationTimer at a starting time of the DRX-onDurationTimer in a second DRX cycle.

In act S308, there are two PDCCH occasions within time of the maximum time offset WUS_offset_max and the minimum time offset WUS_offset_min before a starting time of a DRX-onDurationTimer in a third DRX cycle, then the terminal device determines that the two PDCCH occasions are WUS monitoring occasions.

In act S309, the terminal device sequentially monitors a WUS at the two WUS monitoring occasions determined in act S308, and detects that the WUS indicates to not wake up a UE, then the terminal device does not start a DRX-onDurationTimer at a starting time of the DRX-onDurationTimer in a third DRX cycle.

Based on the above description of the method for monitoring the WUS provided by the embodiments of the present application, another optional detailed processing flow for monitoring the WUS provided by an embodiment of the present application includes the following acts.

In act S401, a terminal device receives Radio Resource Control (RRC) configuration information sent by a network device.

In some embodiments, the RRC configuration information includes contents of the following 1) to 4).

1) A DRX configuration parameter including: a long DRX cycle, a DRX-onDurationTimer and etc.

2) A BWP configuration parameter including one DL BWP.

Figure 5:
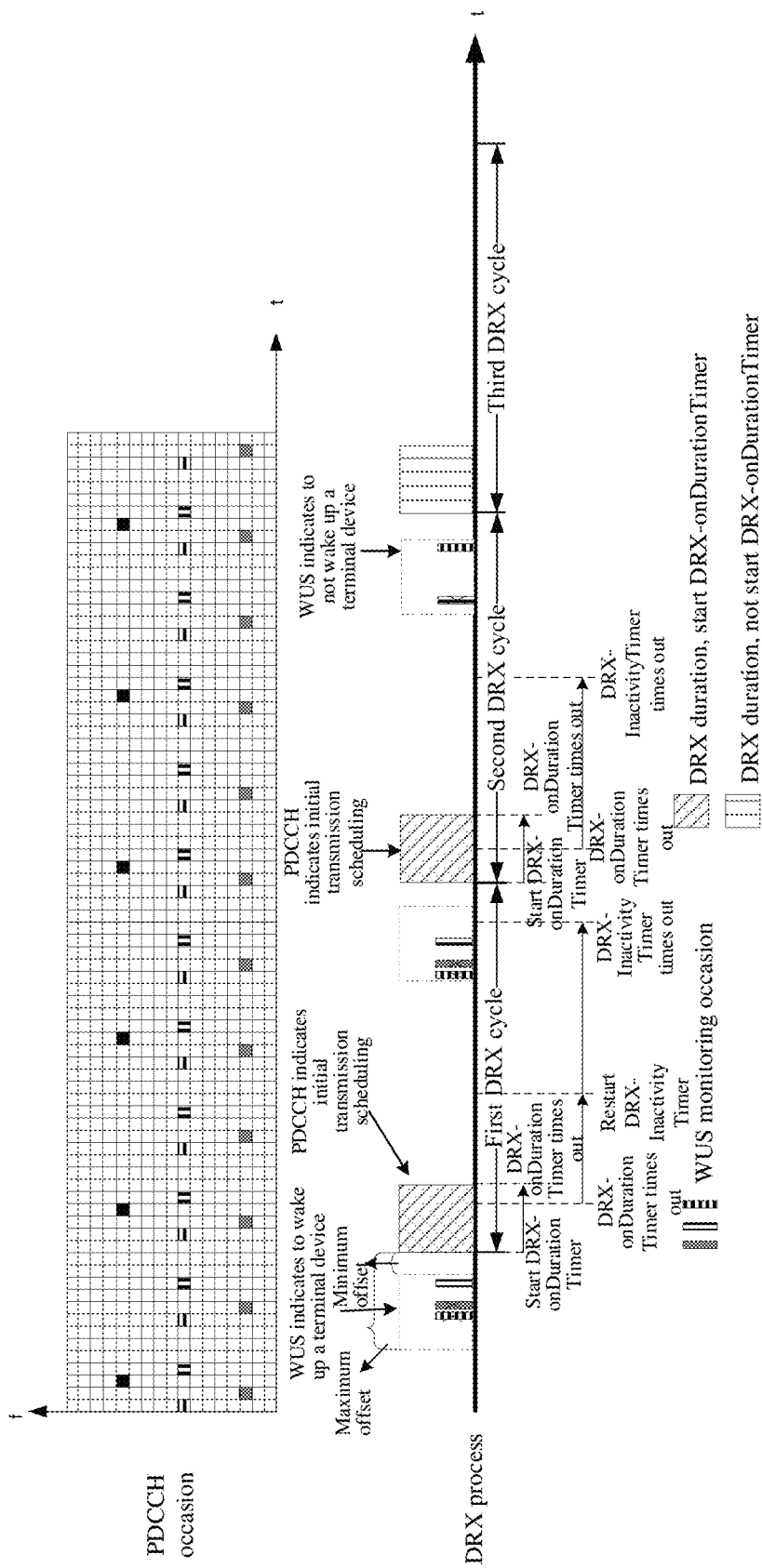
FIG. 5 is another optional schematic diagram of determining a WUS monitoring occasion of an embodiment of the present application.

3) For one DL BWP configured for the terminal device, four PDCCH search spaces are configured, another optional schematic diagram of determining the WUS monitoring occasion is as shown in the following FIG. 5, and all the four PDCCH search spaces may be used as WUS monitoring occasions for the terminal device to monitor the WUS.

4) A configuration of a WUS monitoring occasion in a time domain: configuring a maximum time offset WUS_offset_max between the WUS monitoring occasion and a starting time of a DRX-onDurationTimer, and a minimum time offset WUS_offset_min between the WUS monitoring occasion and a starting time of a DRX-onDurationTimer.

In act S402, a maximum quantity of WUS monitoring occasions of the terminal device before a starting time of a DRX-onDurationTimer in each DRX cycle is 1, and the maximum quantity of WUS monitoring occasions is configured by a network or is a predefined value.

In act S403, there are three PDCCH occasions between the maximum time offset WUS_offset_max and the minimum time offset WUS_offset_min that are between the WUS monitoring occasion and a starting time of a DRX-onDurationTimer in a first DRX cycle, then the terminal device determines that a PDCCH occasion closest to the starting time of the DRX-onDurationTimer in the first DRX cycle of the three PDCCH occasions is a WUS monitoring occasion.

In act S404, the terminal device monitors a WUS on a WUS monitoring occasion determined in act S403, and detects that the WUS indicates to wake up the terminal device, then the terminal device starts a DRX-onDurationTimer at a starting time of the DRX-onDurationTimer in the first DRX cycle.

In act S405, the terminal device receives a PDCCH indicating an initial transmission scheduling during running of a DRX-onDurationTimer, then the terminal device starts a DRX-InactivityTimer, subsequently, the terminal device receives a PDCCH indicating an initial transmission scheduling again during running of a DRX-InactivityTimer, then the terminal device restarts the DRX-InactivityTimer.

In act S406, there are three PDCCH occasions between the maximum time offset WUS_offset_max and the minimum time offset WUS_offset_min that are between the WUS monitoring occasion and a starting time of a DRX-onDurationTimer in a second DRX cycle, then the terminal device determines that a PDCCH occasion closest to the starting time of the DRX-onDurationTimer in the second DRX cycle of the three PDCCH occasions is a WUS monitoring occasion.

In act S407, during the one WUS monitoring occasion determined in act S406, the terminal device is in DRX Active Time and a DRX-InactivityTimer is running, so the terminal device does not monitor a WUS at this WUS monitoring occasion.

In act S408, the terminal device starts a DRX-onDurationTimer at a starting time of the DRX-onDurationTimer in a second DRX cycle.

In act S409, there are two PDCCH occasions within time of the maximum time offset WUS_offset_max and the minimum time offset WUS_offset_min before a starting time of a DRX-onDurationTimer in a third DRX cycle, then the terminal device determines that a PDCCH occasion closest to the starting time of the DRX-onDurationTimer in the third DRX cycle of the two PDCCH occasions is a WUS monitoring occasion.

In act S410, the terminal device monitors a WUS at the WUS monitoring occasion determined in act S409, and detects that the WUS indicates to not wake up a UE, then the terminal device does not start a DRX-onDurationTimer at a starting time of the DRX-onDurationTimer in a third DRX cycle.

Based on the above description of the method for monitoring the WUS provided by the embodiments of the present application, yet another optional detailed processing flow for monitoring the WUS provided by an embodiment of the present application includes the following acts.

In act S501, a terminal device receives Radio Resource Control (RRC) configuration information sent by a network device.

In some embodiments, the RRC configuration information includes contents of the following 1) to 4).

1) A DRX configuration parameter including: a long DRX cycle, a DRX-onDurationTimer and etc.

2) A BWP configuration parameter including one DL BWP.

Figure 6:
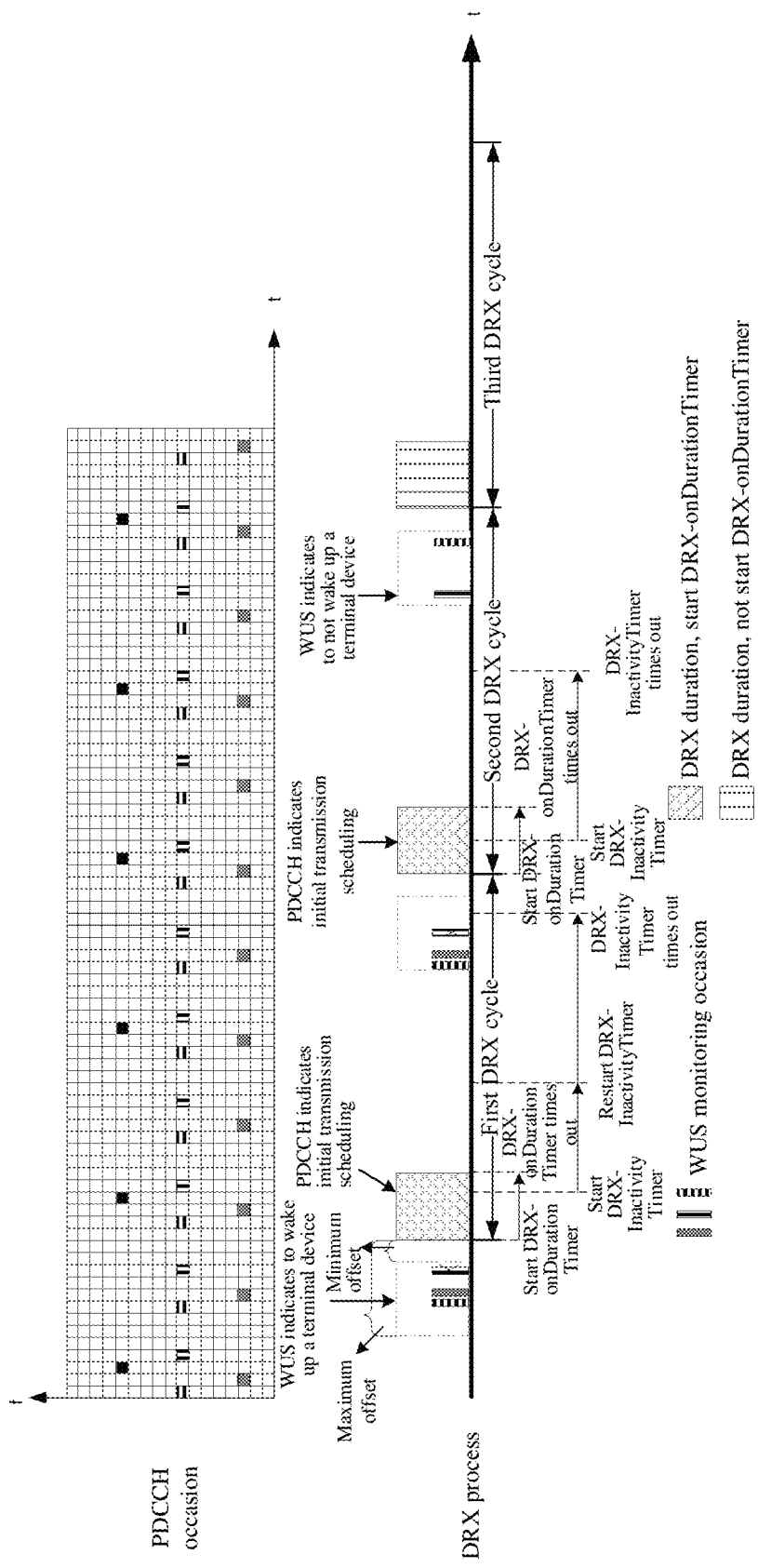
FIG. 6 is yet another optional schematic diagram of determining a WUS monitoring occasion of an embodiment of the present application.

3) For one DL BWP configured for the terminal device, four PDCCH search spaces are configured, yet another optional schematic diagram of determining the WUS monitoring occasion according to an embodiment is as shown in the following FIG. 6, and all the four PDCCH search spaces may be used as WUS monitoring occasions for the terminal device to monitor the WUS.

4) A configuration of a WUS monitoring occasion in a time domain: configuring a maximum time offset WUS_offset_max between the WUS monitoring occasion and a starting time of a DRX-onDurationTimer, and a minimum time offset WUS_offset_min between the WUS monitoring occasion and a starting time of a DRX-onDurationTimer.

In act S502, the maximum quantity of WUS monitoring occasions of the terminal device before a starting time of a DRX-onDurationTimer in each DRX cycle is 2, and the maximum quantity of WUS monitoring occasions is configured by a network or is a predefined value.

In act S503, there are three PDCCH occasions between the maximum time offset WUS_offset_max and the minimum time offset WUS_offset_min that are between the WUS monitoring occasion and a starting time of a DRX-onDurationTimer in a first DRX cycle, then the terminal device determines that two PDCCH occasions farthest from the starting time of the DRX-onDurationTimer in the first DRX cycle of the three PDCCH occasions are WUS monitoring occasions.

In act S504, the terminal device monitors a WUS on two WUS monitoring occasions determined in act S503, and detects that the WUS indicates to wake up the terminal device, then the terminal device starts a DRX-onDurationTimer at a starting time of the DRX-onDurationTimer in a first DRX cycle.

In act S505, the terminal device receives a PDCCH indicating an initial transmission scheduling during running of a DRX-onDurationTimer, then the terminal device starts a DRX-InactivityTimer, subsequently, the terminal device receives a PDCCH indicating an initial transmission scheduling again during running of a DRX-InactivityTimer, then the terminal device restarts the DRX-InactivityTimer.

In act S506, there are three PDCCH occasions between the maximum time offset WUS_offset_max and the minimum time offset WUS_offset_min that are between the WUS monitoring occasion and a starting time of a DRX-onDurationTimer in a second DRX cycle, then the terminal device determines that two PDCCH occasions farthest from the starting time of the DRX-onDurationTimer in the second DRX cycle of the three PDCCH occasions are WUS monitoring occasions.

In act S507, during the two WUS monitoring occasions determined in act S506, the terminal device is in DRX Active Time and a DRX-InactivityTimer is running, so the terminal device does not monitor a WUS in these two WUS monitoring occasions.

In act S508, the terminal device starts a DRX-onDurationTimer at a starting time of the DRX-onDurationTimer in a second DRX cycle.

In act S509, there are two PDCCH occasions within time of the maximum time offset WUS_offset_max and the minimum time offset WUS_offset_min before a starting time of a DRX-onDurationTimer in a third DRX cycle, then the terminal device determines that the two PDCCH occasions are WUS monitoring occasions.

In act S510, the terminal device monitors a WUS at the WUS monitoring occasions determined in act S509, and detects that the WUS indicates to not wake up a UE, then the terminal device does not start a DRX-onDurationTimer at a starting time of the DRX-onDurationTimer in a third DRX cycle.

The method for monitoring the WUS described in the embodiment of the present application is based on a configuration of PDCCH search spaces, and defines that a terminal device monitors a WUS only within a given time range before a starting time of a DRX-onDurationTimer, which not only ensures time validity of WUS information, but also reserves enough time for DRX to process a WUS. In this way, a terminal device can effectively monitor the WUS, and determine whether to start a DRX-onDuration-Timer at a subsequent starting time of the DRX-onDurationTimer according to an indication of the WUS, so as to achieve a purpose of saving power of the terminal device.

Figure 7:
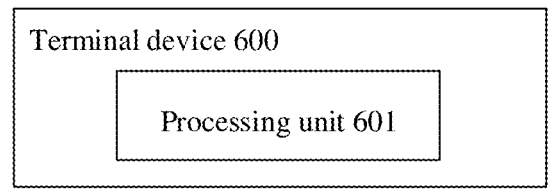
FIG. 7 is a schematic diagram of a structure of a terminal device provided by an embodiment of the present application.

In order to implement the method for monitoring the WUS described in the embodiments of the present application, an embodiment of the present application provides a terminal device, and a structure of the terminal device 600, as shown in FIG. 7, includes a processing unit 601.

The processing unit 601 is configured to determine a WUS monitoring occasion according to configuration information sent by a network device; wherein the configuration information at least includes a BWP parameter and/or a WUS monitoring occasion parameter, and the WUS monitoring occasion is used for monitoring a WUS.

In some embodiments, the configuration information further includes a Discontinuous Reception (DRX) parameter, which at least includes one of the following: a DRX cycle and a DRX-onDurationTimer.

In some embodiments, the BWP parameter includes at least one downlink bandwidth part, and the downlink bandwidth part includes at least one PDCCH search space.

In some embodiments, the PDCCH search space includes a WUS-specific PDCCH search space.

In some embodiments, the WUS monitoring occasion parameter is related to a starting time of a DRX-onDurationTimer of the terminal device.

In some embodiments, the WUS monitoring occasion parameter includes: a maximum time offset between the WUS monitoring occasion and a starting time of a DRX-onDurationTimer; and/or a minimum time offset between the WUS monitoring occasion and a starting time of a DRX-onDurationTimer.

In some embodiments, the processing unit 601 is configured to, before a starting time of a DRX-onDurationTimer in each DRX cycle, determine one or more PDCCH transmission occasions for monitoring the WUS according to the configuration information.

In some embodiments, the processing unit 601 is configured to determine all PDCCH transmission occasions between the maximum time offset and the minimum time offset in all PDCCH search spaces configured on a currently activated downlink BWP as the WUS monitoring occasions.

The maximum time offset is a maximum time offset between the WUS monitoring occasion and a starting time of a DRX-onDurationTimer, and the minimum time offset is a minimum time offset between the WUS monitoring occasion and a starting time of a DRX-onDurationTimer.

It should be noted that the WUS monitoring occasions involved in the embodiments of the present application are all located before the starting time of the DRX-onDuration-Timer.

In some embodiments, the processing unit 601 is configured to determine all WUS-specific PDCCH transmission occasions between the maximum time offset and the minimum time offset in WUS-specific PDCCH search spaces configured on a currently activated downlink BWP as the WUS monitoring occasions.

The maximum time offset is a maximum time offset between the WUS monitoring occasion and a starting time of a DRX-onDurationTimer, and the minimum time offset is a minimum time offset between the WUS monitoring occasion and a starting time of a DRX-onDurationTimer.

In some embodiments, the processing unit 601 is configured to determine that in all PDCCH transmission occasions between the maximum time offset and the minimum time offset of all PDCCH search spaces configured on a currently activated downlink BWP, at most N PDCCH transmission occasions closest to a starting time of a DRX-onDurationTimer are the WUS monitoring occasions, wherein N is a positive integer.

The maximum time offset is a maximum time offset between the WUS monitoring occasion and the starting time of the DRX-onDurationTimer, and the minimum time offset is a minimum time offset between the WUS monitoring occasion and the starting time of the DRX-onDurationTimer.

In some embodiments, the processing unit 601 is configured to determine that in all WUS-specific PDCCH transmission occasions between the maximum time offset and the minimum time offset of WUS-specific PDCCH search spaces configured on a currently activated downlink BWP, at most N PDCCH transmission occasions closest to a starting time of a DRX-onDurationTimer are the WUS monitoring occasions, wherein N is a positive integer.

The maximum time offset is a maximum time offset between the WUS monitoring occasion and the starting time of the DRX-onDurationTimer, and the minimum time offset is a minimum time offset between the WUS monitoring occasion and the starting time of the DRX-onDurationTimer.

In some embodiments, the processing unit 601 is configured to determine that in all PDCCH transmission occasions before the minimum time offset of all PDCCH search spaces configured on a currently activated downlink BWP, at most N PDCCH transmission occasions closest to a starting time of a DRX-onDurationTimer are the WUS monitoring occasions, wherein N is a positive integer.

The minimum time offset includes a minimum time offset between the WUS monitoring occasion and the starting time of the DRX-onDurationTimer.

In some embodiments, the processing unit 601 is configured to determine that in all WUS-specific PDCCH transmission occasions before the minimum time offset of WUS-specific PDCCH search spaces configured on a currently activated downlink BWP, at most N PDCCH transmission occasions closest to a starting time of a DRX-onDurationTimer are the WUS monitoring occasions, wherein N is a positive integer. The minimum time offset includes a minimum time offset between the WUS monitoring occasion and the starting time of the DRX-onDurationTimer.

In some embodiments, the processing unit 601 is configured to determine that in all PDCCH transmission occasions between the maximum time offset and the minimum time offset of all PDCCH search spaces configured on a currently activated downlink BWP, at most N PDCCH transmission occasions farthest from a starting time of a DRX-onDurationTimer are the WUS monitoring occasions, wherein N is a positive integer.

The maximum time offset is a maximum time offset between the WUS monitoring occasion and the starting time of the DRX-onDurationTimer, and the minimum time offset includes a minimum time offset between the WUS monitoring occasion and the starting time of the DRX-onDurationTimer.

In some embodiments, the processing unit 601 is configured to determine that in all WUS-specific PDCCH transmission occasions between the maximum time offset and the minimum time offset of WUS-specific PDCCH search spaces configured on a currently activated downlink BWP, at most N PDCCH transmission occasions farthest from a starting time of a DRX-onDurationTimer are the WUS monitoring occasions, wherein N is a positive integer.

The maximum time offset is a maximum time offset between the WUS monitoring occasion and the starting time of the DRX-onDurationTimer, and the minimum time offset includes a minimum time offset between the WUS monitoring occasion and the starting time of the DRX-onDurationTimer.

In some embodiments, the processing unit 601 is further configured to confirm whether to monitor a WUS at the WUS monitoring occasion according to a DRX state of the terminal device at the WUS monitoring occasion.

In some embodiments, the processing unit 601 is configured to not monitor a WUS at the WUS monitoring occasion in a case where time occupied by the WUS monitoring occasion of the terminal device in a time domain is all within DRX active time.

Or, the processing unit 601 is configured to not monitor a WUS at the WUS monitoring occasion in a case where part of time occupied by the WUS monitoring occasion of the terminal device in a time domain is within DRX active time.

In some embodiments, the processing unit 601 is configured to monitor the WUS at the WUS monitoring occasion in a case where time occupied by the WUS monitoring occasion of the terminal device in a time domain is all within DRX inactive time.

In some embodiments, the processing unit 601 is further configured to determine a starting state of a DRX-onDurationTimer at a starting time of the DRX-onDurationTimer according to a monitoring and/or receiving situation of a WUS.

In some embodiments, the processing unit 601 is configured to determine to start a DRX-onDurationTimer at a starting time of the DRX-onDurationTimer in a case where a quantity of the determined WUS monitoring occasions is zero; or, in a case where a quantity of WUS monitoring occasions at which the WUS will be monitored is zero, to determine to start a DRX-onDurationTimer at a starting time of the DRX-onDurationTimer.

In some embodiments, the processing unit 601 is configured to determine to start a DRX-onDurationTimer at a starting time of the DRX-onDurationTimer in a case where a WUS is monitored and received and the WUS indicates to wake up the terminal device.

In some embodiments, the processing unit 601 is configured to determine to not start a DRX-onDurationTimer at a starting time of the DRX-onDurationTimer in a case where a WUS is monitored and received and the WUS indicates to not wake up the terminal device.

In some embodiments, the processing unit 601 is configured to determine to not start a DRX-onDurationTimer at a starting time of the DRX-onDurationTimer in a case where a WUS is monitored and no WUS is received.

In some embodiments, the configuration information includes RRC configuration information.

In some embodiments, a time interval between the WUS monitoring occasion and a starting time of a DRX-onDurationTimer is not greater than a DRX cycle.

It should be noted that the WUS monitoring occasions involved in the embodiments of the present application are all located before the starting time of the DRX-onDurationTimer.

Figure 8:
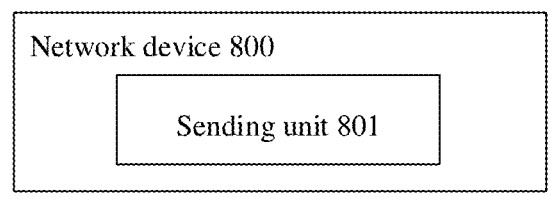
FIG. 8 is a schematic diagram of a structure of a network device provided by an implementation of the present application.

In order to implement the method for monitoring the WUS described in the embodiments of the present application, an embodiment of the present application provides a network device, and a structure of the network device 800, as shown in FIG. 8, includes a sending unit 801.

The sending unit 801 is configured to send configuration information to a terminal device.

The configuration information at least includes a BWP parameter and/or a WUS monitoring occasion parameter;

and the BWP parameter and/or WUS monitoring occasion parameter are used for the terminal device to determine a WUS monitoring occasion.

In some embodiments, the configuration information further includes a DRX parameter, which at least includes one of the following: a DRX cycle and a DRX-onDurationTimer.

In some embodiments, the BWP parameter includes at least one downlink bandwidth part, and each downlink bandwidth part includes at least one PDCCH search space.

In some embodiments, the PDCCH search space includes a WUS-specific PDCCH search space.

In some embodiments, the WUS monitoring occasion parameter is related to a starting time of a DRX-onDurationTimer of the terminal device.

In some embodiments, the WUS monitoring occasion parameter include: a maximum time offset between the WUS monitoring occasion and a starting time of a DRX-onDurationTimer; and/or a minimum time offset between the WUS monitoring occasion and a starting time of a DRX-onDurationTimer.

In some embodiments, the configuration information includes RRC configuration information.

In some embodiments, a time interval between the WUS monitoring occasion and a starting time of a DRX-onDurationTimer is not greater than a DRX cycle.

It should be noted that the WUS monitoring occasions involved in the embodiments of the present application are all located before the starting time of the DRX-onDurationTimer.

An embodiment of the present application further provides a terminal device, including a processor and a memory configured to store a computer program that is capable of being run on the processor, wherein the processor is configured to perform acts of the method for monitoring the WUS performed by the terminal device when running the computer program.

An embodiment of the present application further provides a network device, including a processor and a memory configured to store a computer program that is capable of being run on the processor, wherein the processor is configured to perform acts of the method for monitoring the WUS performed by the network device when running the computer program.

An embodiment of the present application further provides a chip, including a processor, configured to invoke and run a computer program from a memory, so that a device installed with the chip performs the method for monitoring the WUS performed by the terminal device.

An embodiment of the present application further provides a chip, including a processor, configured to invoke and run a computer program from a memory, so that a device installed with the chip performs the method for monitoring the WUS performed by the network device.

An embodiment of the present application further provides a storage medium, storing an executable program, wherein, when the executable program is executed by a processor, the method for monitoring the WUS performed by the terminal device is implemented.

An embodiment of the present application further provides a storage medium, storing an executable program, wherein, when the executable program is executed by a processor, the method for monitoring the WUS performed by the network device is implemented.

An embodiment of the present application further provides a computer program product including computer program instructions that enable a computer to perform the method for monitoring the WUS performed by the terminal device.

An embodiment of the present application further provides a computer program product including computer program instructions that enable a computer to perform the method for monitoring the WUS performed by the network device.

An embodiment of the present application further provides a computer program, which enables a computer to perform the method for monitoring the WUS performed by the terminal device.

An embodiment of the present application further provides a computer program, which enables a computer to perform the method for monitoring the WUS performed by the network device.

Figure 9:
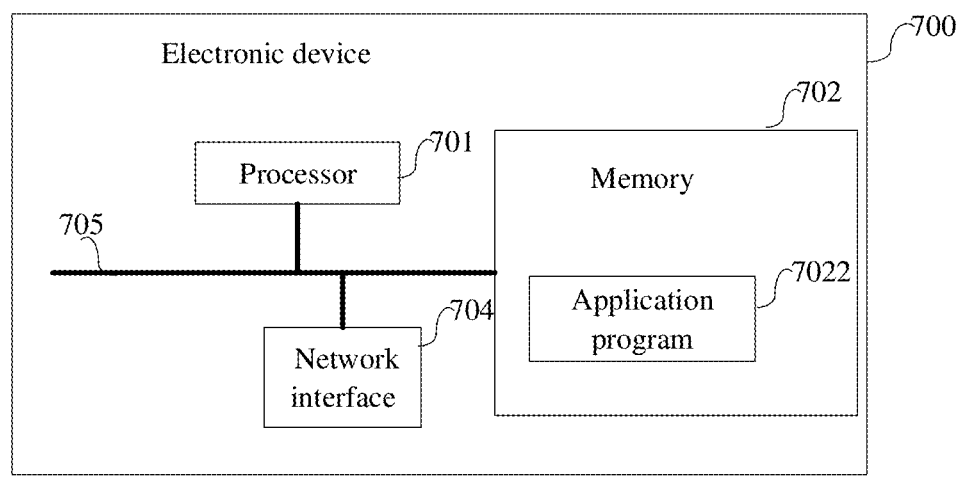
FIG. 9 is a schematic diagram of a hardware structure of an electronic device of an embodiment of the present application.

FIG. 9 is a schematic diagram of a hardware structure of an electronic device (a terminal device or a network device) of an embodiment of the present application. The electronic device 700 includes: at least one processor 701, a memory 702, and at least one network interface 704. Various components in the electronic device 700 are coupled together by a bus system 705. It may be understood that the bus system 705 is used for implementing connection and communication between these components. In addition to a data bus, the bus system 705 also includes a power bus, a control bus, and a status signal bus. However, for clarity, all kinds of buses are uniformly referred to as the bus system 705 in FIG. 9.

It may be understood that the memory 702 may be a volatile memory or a non-volatile memory, or may include both the volatile memory and the non-volatile memory. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disk, or a Compact Disc Read-Only Memory (CD-ROM). The magnetic surface memory may be a magnetic disk memory or a magnetic tape memory. The volatile memory may be a Random Access Memory (RAM) which serves as an external cache. By way of exemplary but not restrictive illustrations, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), a Direct Rambus Random Access Memory (DRRAM). The memory 702 described in the embodiment of the present application is intended to include, but is not limited to, these and any other suitable types of memories.

The memory 702 in the embodiment of the present application is configured to store various types of data to support operations of the electronic device 700. Examples of such data include any computer program for operating on the electronic device 700, such as an application program 7022. A program for implementing the method of the embodiment of the present application may be contained in the application program 7022.

Methods disclosed in above embodiments of the present application may be applied to the processor 701 or implemented by the processor 701. The processor 701 may be an integrated circuit chip with a signal processing capability. In an implementation process, the acts of the methods described above may be accomplished by integrated logic circuits of hardware in the processor 701 or instructions in a form of software. The above processor 701 may be a general purpose processor, a Digital Signal Processor (DSP), or other programmable logic devices, a discrete gate or transistor logic device, or a discrete hardware component, etc. The processor 701 may implement or perform the methods, acts, and logical block diagrams disclosed in the embodiments of the present application. The general purpose processor may be a microprocessor or any conventional processor or the like. The acts of the methods disclosed in the embodiments of the present application may be directly embodied to be performed by a hardware decoding processor, or may be performed by a combination of hardware in the decoding processor and software modules. The software module may be located in a storage medium, and the storage medium is located in the memory 702. The processor 701 reads information in the memory 702 and accomplishes the acts of the aforementioned methods in combination with hardware thereof.

In an exemplary embodiment, an electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs or other electronic components, for executing the aforementioned methods.

An embodiment of the present application further provides a storage medium configured to store a computer program.

Optionally, the storage medium may be applied to the terminal device in the embodiments of the present application, and the computer program enables the computer to execute a corresponding flow in each method of the embodiments of the present application, which will not be repeated here for brevity.

An embodiment of the present application further provides a chip, including a processor, configured to invoke and run a computer program from a memory, so that a device installed with the chip performs the method for monitoring the WUS.

An embodiment of the present application further provides a computer program product including computer program instructions that enable a computer to perform the method for monitoring the WUS.

An embodiment of the present application further provides a computer program, which enables a computer to perform the method for monitoring the WUS.

The present application is described with reference to flowcharts and/or block diagrams of the methods, devices (systems), and computer program products of the embodiments of the present application. It should be understood that each flow and/or block in the flowcharts and/or block diagrams, and combinations of flows and/or blocks in the flowcharts and/or block diagrams may be implemented by computer program instructions. These computer program instructions may be provided to a general purpose computer, a special purpose computer, an embedded processor or a processor of other programmable data processing device to produce a machine, such that the instructions which are executed by the computer or the processor of other programmable data processing device produce an apparatus for implementing the functions specified in one or more flows of the flowcharts and/or one or more blocks of the block diagrams.

These computer program instructions may also be stored in a computer-readable memory that can direct a computer or another programmable data processing device to operate in a specific manner, such that instructions stored in the computer-readable memory produce an article of manufacture including instruction apparatuses that implement functions specified in one or more flows of the flowcharts and/or one or more blocks of the block diagrams.

These computer program instructions may also be loaded onto a computer or other programmable data processing devices, such that a series of operational acts are performed on the computer or other programmable devices to produce a computer-implemented processing, thereby the instructions which are executed on the computer or other programmable devices are used for implementing acts of the functions specified in one or more flows of the flowcharts and/or one or more blocks of the block diagrams.

It should be understood that the terms "system" and "network" in the present application are often used interchangeably herein. The term "and/or" in the present application describes an association relation between associated objects only, indicating that there may be three relations, for example, A and/or B may indicate three cases: A alone, both A and B, and B alone. In addition, the symbol "/" in the present application generally indicates that there is a "or" relationship between the associated objects before and after "/".

The above description is only the preferred embodiments of the present application, and is not intended to limit the protection scope of the present application. Any modification, equivalent substitution, improvement, etc., made within the spirit and principles of the present application shall be included in the protection scope of the present application.

What is claimed is:

1. A method for monitoring a Wake-Up Signal (WUS), comprising: determining, by a terminal device, a WUS monitoring occasion according to configuration information sent by a network device; wherein the configuration information comprises a WUS monitoring occasion parameter; wherein determining, by the terminal device, the WUS monitoring occasion according to the configuration information sent by the network device comprises: determining, by the terminal device, one or more PDCCH transmission occasions for monitoring the WUS according to the configuration information before a starting time of a DRX-onDurationTimer in each DRX cycle; determining, by the terminal device, that all WUS-specific PDCCH transmission occasions between a maximum time offset and a minimum time offset in WUS-specific PDCCH search spaces configured on a currently activated downlink BWP are WUS monitoring occasions; wherein the maximum time offset comprises a maximum time offset between the WUS monitoring occasion and a starting time of a DRX-onDurationTimer, and the minimum time offset comprises a minimum time offset between the WUS monitoring occasion and the starting time of the DRX-onDurationTimer; and the WUS monitoring occasions are located before the starting time of the DRX-onDurationTimer.

2. The method according to claim 1, wherein the configuration information further comprises a Discontinuous Reception (DRX) parameter, and the DRX parameter at least comprises one of a DRX cycle and a DRX-onDurationTimer.

3. The method according to claim 1, wherein the WUS monitoring occasion parameter is related to a starting time of a DRX-onDurationTimer of the terminal device.

4. The method according to claim 1, wherein the WUS monitoring occasion parameter comprises:
a maximum time offset between the WUS monitoring occasion and a starting time of a DRX-onDurationTimer;
and/or, a minimum time offset between the WUS monitoring occasion and the starting time of the DRX-onDurationTimer;
wherein the WUS monitoring occasion is located before the starting time of the DRX-onDurationTimer.

5. The method according to claim 1, wherein determining, by the terminal device, the WUS monitoring occasion according to the configuration information sent by the network device comprises:
determining, by the terminal device, that in all WUS-specific PDCCH transmission occasions between a maximum time offset and a minimum time offset of WUS-specific PDCCH search spaces configured on a currently activated downlink BWP, at most N PDCCH transmission occasions closest to a starting time of a DRX-onDurationTmer are WUS monitoring occasions, wherein N is a positive integer;
wherein the maximum time offset comprises a maximum time offset between the WUS monitoring occasion and the starting time of the DRX-onDurationTimer, and the minimum time offset comprises a minimum time offset between the WUS monitoring occasion and the starting time of the DRX-onDurationTimer;
the WUS monitoring occasions are located before the starting time of the DRX-onDurationTimer.

6. The method according to claim 1, further comprising:
confirming, by the terminal device, whether to monitor the WUS at the WUS monitoring occasion according to a DRX state of the terminal device at the WUS monitoring occasion.

7. A terminal device, comprising: a processor, configured to determine a Wake-Up signal (WUS) monitoring occasion according to configuration information sent by a network device; wherein the configuration information comprises a WUS monitoring occasion parameter; wherein the processor is configured to, before a starting time of a DRX-onDurationTimer in each DRX cycle, determine one or more PDCCH transmission occasions for monitoring the WUS according to the configuration information; wherein the processor is configured to determine that all WUS-specific PDCCH transmission occasions between a maximum time offset and a minimum time offset in WUS-specific PDCCH search spaces configured on a currently activated downlink BWP are WUS monitoring occasions; wherein the maximum time offset comprises a maximum time offset between the WUS monitoring occasion and a starting time of a DRX-onDurationTimer, and the minimum time offset comprises a minimum time offset between the WUS monitoring occasion and the starting time of the DRX-onDurationTimer; the WUS monitoring occasions are located before the starting time of the DRX-onDurationTimer.

8. The terminal device according to claim 7, wherein the configuration information further comprises a Discontinuous Reception (DRX) parameter, and the DRX parameter at least comprises one of a DRX cycle and a DRX-onDurationTimer.

9. The terminal device according to claim 7, wherein the WUS monitoring occasion parameter is related to a starting time of a DRX-onDurationTimer of the terminal device.

10. The terminal device according to claim 7, wherein the WUS monitoring occasion parameter comprises:
a maximum time offset between the WUS monitoring occasion and a starting time of a DRX-onDurationTimer;
and/or, a minimum time offset between the WUS monitoring occasion and the starting time of the DRX-onDurationTimer;
wherein the WUS monitoring occasion is located before the starting time of the DRX-onDurationTimer.

11. The terminal device according to claim 7, wherein the processor is configured to determine that in all WUS-specific PDCCH transmission occasions between a maximum time offset and a minimum time offset of WUS-specific PDCCH search spaces configured on a currently activated downlink BWP, at most N PDCCH transmission occasions closest to a starting time of a DRX-onDuration Tmer are WUS monitoring occasions, wherein N is a positive integer;
wherein the maximum time offset comprises a maximum time offset between the WUS monitoring occasion and the starting time of the DRX-onDurationTimer, and the minimum time offset comprises a minimum time offset between the WUS monitoring occasion and the starting time of the DRX-onDurationTimer;
the WUS monitoring occasions are located before the starting time of the DRX-onDurationTimer.

12. The terminal device according to claim 7, wherein the processor is further configured to confirm whether to monitor the WUS at the WUS monitoring occasion according to a DRX state of the terminal device at the WUS monitoring occasion.

13. A network device, comprising: a transmitter, configured to send configuration information to a terminal device; wherein the configuration information comprises a Wake-Up Signal (WUS) monitoring occasion parameter; the configuration information is used for the terminal device to determine a WUS monitoring occasion, before a starting time of a DRX-onDurationTimer in each DRX cycle, one or more PDCCH transmission occasions for monitoring the WUS according to the configuration information; the configuration information is further used for the terminal device to determine that all WUS-specific PDCCH transmission occasions between a maximum time offset and a minimum time offset in WUS-specific PDCCH search spaces configured on a currently activated downlink BWP are WUS monitoring occasions; wherein the maximum time offset comprises a maximum time offset between the WUS monitoring occasion and a starting time of a DRX-onDurationTimer, and the minimum time offset comprises a minimum time offset between the WUS monitoring occasion and the starting time of the DRX-onDurationTimer; the WUS monitoring occasions are located before the starting time of the DRX-onDurationTimer.

14. The network device according to claim 13, wherein the configuration information further comprises a Discontinuous Reception (DRX) parameter, and the DRX parameter at least comprises one of a DRX cycle and a DRX-onDurationTimer.

15. The network device according to claim 13, wherein the WUS monitoring occasion parameter is related to a starting time of a DRX-onDurationTimer of the terminal device.

* * * * *